(12) United States Patent
Dooley

(10) Patent No.: US 7,755,532 B2
(45) Date of Patent: Jul. 13, 2010

(54) METHODS AND APPARATUS FOR ASSIGNMENT AND MAINTENANCE OF UNIQUE AIRCRAFT ADDRESSES FOR TIS-B SERVICES

(75) Inventor: Graham C. Dooley, Snow Hill, MD (US)

(73) Assignee: Raytheon Company, Waltham, MA (US)

( * ) Notice: Subject to any disclaimer, the term of this patent is extended or adjusted under 35 U.S.C. 154(b) by 291 days.

(21) Appl. No.: 12/129,926

(22) Filed: May 30, 2008

(65) Prior Publication Data

US 2009/0322589 A1    Dec. 31, 2009

Related U.S. Application Data

(60) Provisional application No. 60/941,365, filed on Jun. 1, 2007.

(51) Int. Cl.
G01S 13/00 (2006.01)
(52) U.S. Cl. .......................................... 342/36; 342/42

(58) Field of Classification Search ............. 342/36–40, 342/42–51

See application file for complete search history.

(56) References Cited

U.S. PATENT DOCUMENTS 6,952,631 B2 * 10/2005 Griffith et al. ................. 701/13

* cited by examiner

Primary Examiner—Thomas H Tarcza
Assistant Examiner—Timothy A Brainard
(74) Attorney, Agent, or Firm—Daly, Crowley, Mofford & Durkee, LLP

(57) ABSTRACT

Methods and apparatus for assigning a pseudo address to an aircraft not equipped with an ADS-B transponder and maintaining the assigned pseudo address over a number of regions each supported by different TIS-B systems. In an exemplary embodiment, each TIS-B system is assigned a range of addresses particular to the region in which the TIS-B system is located.

15 Claims, 6 Drawing Sheets

METHODS AND APPARATUS FOR ASSIGNMENT AND MAINTENANCE OF UNIQUE AIRCRAFT ADDRESSES FOR TIS-B SERVICES

CROSS REFERENCE TO RELATED APPLICATIONS

The present application claims the benefit of U.S. Provisional Patent Application No. 60/941,365, filed on Jun. 1, 2007, which is incorporated herein by reference.

BACKGROUND

As described by the FAA (Federal Aeronautics Administration), ADS-B is an air traffic control system that uses signals from Global Positioning Satellites (GPS), instead of radar data, to keep aircraft at safe distances from one another. The ADS-B system provides air traffic controllers and pilots with accurate information that will help keep aircraft safely separated in the sky and on runways. With ADS-B some of the responsibility for keeping safe distances between aircraft is shifted from air traffic controllers on the ground to pilots who will have displays in the cockpits showing air traffic around them.

SUMMARY

The present invention provides methods and apparatus for assigning pseudo address to aircraft not equipped with ADS-B transponders that must still be processed within a system that monitors and reports the locations of all aircraft. The assigned pseudo address assigned in one region is maintained across all regions in the air space.

In one aspect of the invention, a method comprises determining whether a track update for a ADS-B unequipped aircraft correlates with an entry in a track file for first TIS-B system for a first region, the first TIS-B system having a first aircraft assignment processor with a first range of addresses allocated to the first region, wherein the first TIS-B system is adjacent to a second TIS-B system for a second region, assigning, for a new entry in the track file for the aircraft, a pseudo address for the aircraft from the first range of addresses, publishing track updates for the aircraft from only a first one of the first and second TIS-B systems, regardless of how many TIS-B systems are actually tracking the aircraft, transmitting a message to the second TIS-B system for the second region when the aircraft enters a handoff region for the first region without requiring the first TIS-B system to know which region will next provide coverage for the aircraft, and maintaining the pseudo address assigned by the first aircraft assignment processor for the aircraft in the second regions along a route of flight.

In another aspect of the invention, a system comprises a first TIS-B system for a first region having a first handoff region, the first TIS-B system having a first aircraft assignment processor to assign pseudo addresses to an aircraft unequipped with an ADS-B transponder, and a second TIS-B system for a second region adjacent to the first region, the second TIS-B system having a second aircraft assignment processor to assign pseudo addresses to an aircraft unequipped with an ADS-B transponder, wherein the first TIS-B system broadcasts a message containing track information for the aircraft to the second TIS-B system for the second region when an aircraft enters the first handoff region without requiring the first TIS-B system to know which region will next provide coverage for the aircraft, wherein the pseudo address assigned to the aircraft by the first aircraft assignment processor is used by the second TIS-B system for the aircraft.

In a further aspect of the invention, an article comprises a computer-readable medium containing stored instructions that enable a machine to perform the steps of: determining whether a track update for a ADS-B unequipped aircraft correlates with an entry in a track file for first TIS-B system for a first region, the first TIS-B system having a first aircraft assignment processor with a first range of addresses allocated to the first region, wherein the first TIS-B system is adjacent to a second TIS-B system for a second region, assigning, for a new entry in the track file for the aircraft, a pseudo address for the aircraft from the first range of addresses, publishing track updates for the aircraft from only a first one of the first and second TIS-B systems, regardless of how many TIS-B systems are actually tracking the aircraft, transmitting a message to the second TIS-B system for the second region when the aircraft enters a handoff region for the first region without requiring the first TIS-B system to know which region will next provide coverage for the aircraft, and maintaining the pseudo address assigned by the first aircraft assignment processor for the aircraft in the second regions along a route of flight.

BRIEF DESCRIPTION OF THE DRAWINGS

The foregoing features of this invention, as well as the invention itself, may be more fully understood from the following description of the drawings in which.

DETAILED DESCRIPTION

Figure 1:
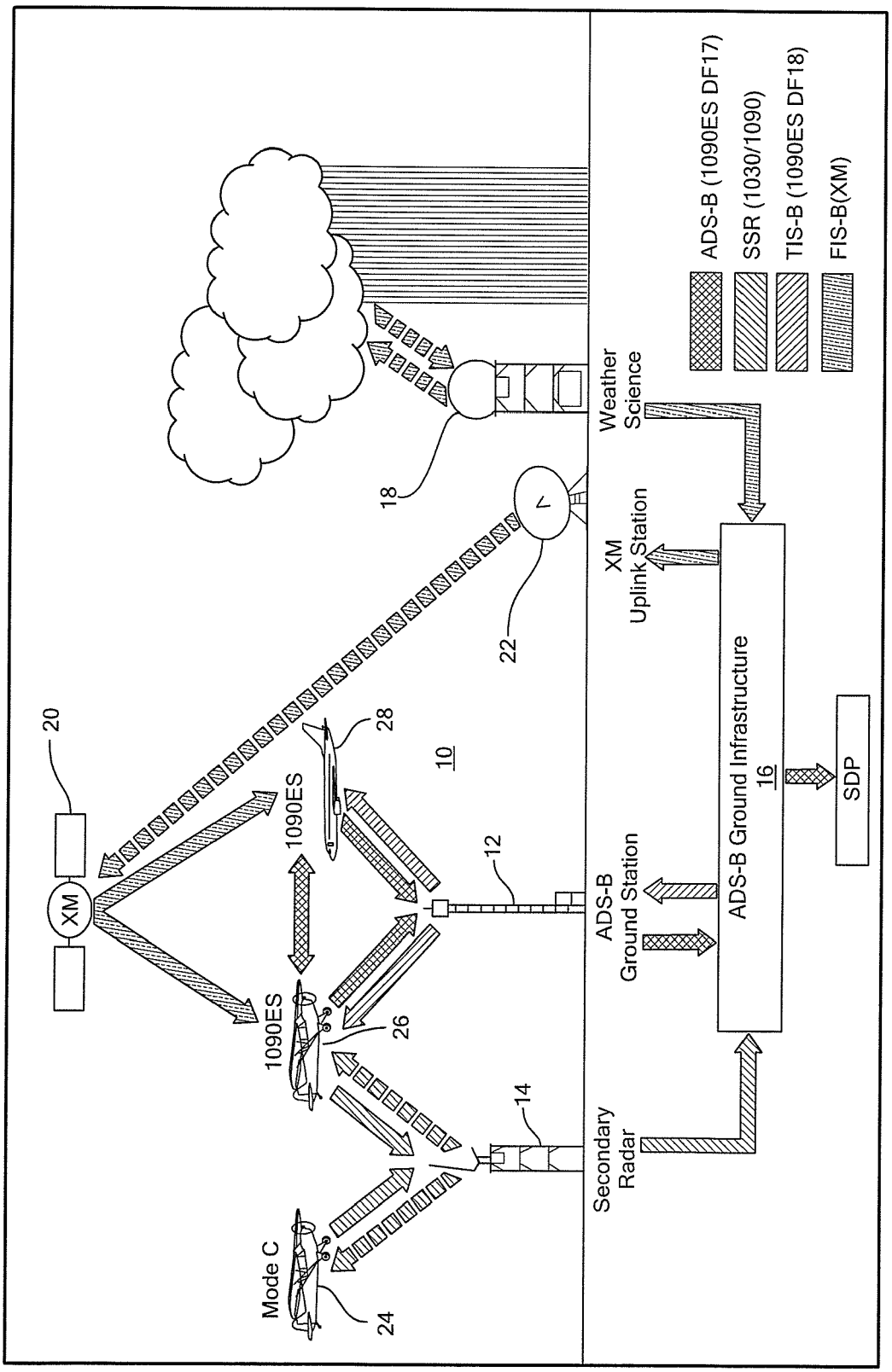
FIG. 1 is a schematic diagram of an air traffic control system having aircraft address assignment.

Before describing exemplary embodiments of the invention, some introductory information is provided. In general, ADS-B systems work by having aircraft receive GPS signals and use them to determine the aircraft's precise location in the sky. The aircraft avionics system uses this position for precise navigation, and also broadcasts it along with other data from the aircraft's flight monitoring system, such as the type of aircraft, its speed, its flight number, and whether it is turning, climbing, or descending. The data is automatically broadcast by the aircraft transponder periodically (typically once or twice a second) using either the 1090 MHz Mode S Extended Squitter (1090ES) or the 978 MHz Universal Access Transceiver (UAT). Both technologies are approved for use in the National Airspace System (NAS), with 1090ES being predominantly used by the commercial airlines and UAT being used by the General Aviation community.

Aircraft equipped to receive the data, and ADS-B ground stations up to 200 miles away, receive these broadcasts. ADS-B ground stations add radar-based targets for non-ADS-B-equipped aircraft to the mix and send the information back up to all equipped aircraft on both frequencies—this function is called Traffic Information Service-Broadcast (TIS-B). ADS-B ground stations also send aircraft information from the national weather service and flight information, such as temporary flight restrictions—this is called Flight Information Service-Broadcast (FIS-B).

Pilots see this information on their cockpit traffic display screens. Air traffic controllers see the information on displays they are already using, when adapted to process this data source.

When properly equipped with ADS-B, both pilots and controllers see the same real-time displays of air traffic. Pilots will have much better situational awareness than in conventional systems because they will know where their own aircraft is with greater accuracy, and their displays will show them the aircraft in the air around them. Pilots will be able to maintain safe separation from other aircraft with fewer instructions from ground-based controllers. At night and in poor visual conditions, pilots will also be able to see where they are in relation to the ground using on-board avionics and terrain maps.

ADS-B also increases airport and air corridor capacity, because the more accurate tracking means aircraft will be able to fly safely and more predictably with less distance between them. And, because ADS-B accuracy also means better predictability, air traffic controllers will be better able to manage the air traffic arriving and departing from congested airports, resulting in even more gains in capacity.

While radar technology has advanced, radar systems occasionally have problems discriminating airplanes from migratory birds and rain "clutter." Secondary surveillance radar (SSR) systems can determine what objects are because they interrogate transponders; however, both primary and secondary radars are very large structures that are expensive to deploy, need lots of maintenance, and require the agency to lease real estate to situate them.

The automatic function of ADS-B eliminates the need for action by a pilot and/or air traffic controller for the information to be issued. The system has dependent surveillance aspect in that the acquired surveillance-type information depends on the navigation and broadcast capability of the source.

An ADS-B system includes a transmitter that includes message generation and transmission functions at the source and a receiver that includes message reception and report assembly functions at the receiving vehicle or ground system.

An Air Traffic Control Radar Beacon System (ATCRBS) is used in air traffic control (ATC) to enhance radar monitoring of aircraft and aircraft separation. The system acquires information for monitored aircraft and provides this information to the air traffic controllers. This information can be used to identify returns from aircraft and to distinguish those returns from ground clutter.

The system includes aircraft transponders and secondary surveillance radars (SSRs), installed at ATC locations. The SSR transmits interrogations and listens for replies. The aircraft transponders receive interrogations and determine whether to reply.

An ATC ground station typically includes a primary surveillance radar that transmits pulses and receives signal returns from aircraft and a secondary surveillance radar (SSR) having a main antenna and/or an omnidirectional antenna. A primary receives signal returns from a target while the SSR receives responses actively transmitted by an aircraft or other object. The relatively high frequency pulses are known as interrogation.

The SSR system scans the area and transmits interrogations over the scan area. The interrogations specify what type of information a replying transponder should send by using a system of modes, e.g., mode 1, mode 2, mode 3/A, mode 4 (IFF), Mode 5, and mode C. Mode S is a discrete selective interrogation mode that also facilitates TCAS for civil aircraft. In addition, it provides the basis for the ADS-B communications link used by commercial aircraft (i.e., enhanced mode S).

Commercial aircraft that fly mainly at high altitudes are equipped with 1090ES capability, while General Aviation (GA) aircraft flying at lower altitudes typically have UAT (Universal Access Transceiver). This dual link approach does not provide air-to-air ADS-B capability for aircraft equipped with only one link technology. When both types of ADS-B link are in use, ADS-B ground stations use ground-to-air broadcasts to relay ADS-B reports received on one link to aircraft using the other link (ADS rebroadcast, or ADS-R).

The TIS-B system completes the air surveillance picture by providing surveillance target information derived from radar on the ADS-B data links so that all ADS-B equipped aircraft can see all aircraft in their vicinity, regardless of equipage. The ADS-B ground station transmits the surveillance information derived from radar on both ADS-B data links, as well as the ADS-R information on the alternate link.

One issue for ADS-B is the capacity for carrying message traffic from aircraft, as well as allowing a link, such as a radio channel, to support legacy systems. The more message traffic there is, the less aircraft can be supported due to bandwidth limitations.

Another issue in ADS-B system is that the increasing volume of air traffic and the emerging use of Automatic Dependent Surveillance creates frequency congestion in the 1090 MHz spectrum which reduces the efficacy of airborne and ground-based surveillance. Reduction in frequency congestion has been a motivation for development of Mode S radar, as well as the development of monopulse SSR radar.

FIG. 1 shows an exemplary ADS-B system 10 having unique aircraft address assignment module 17 for TIS-B services in accordance with exemplary embodiments of the invention. The system 10 includes an ADS-B ground station 12 and a secondary surveillance radar (SSR) 14 coupled via ADS-B ground infrastructure 16. A weather service installation 18 communicates with an XM satellite 20 via an antenna 22. The weather service installation 18 and the antenna uplink 22 are coupled to the ADS-B ground infrastructure 16.

The SSR 14 communicates via Mode C for some aircraft 24 and via 1090ES for other aircraft 26. The ADS-B 12 communicates with aircraft 26 while various aircraft 26, 28 can communicate directly with each other. Some of the aircraft also receive messages from the XM satellite 20.

In an exemplary embodiment, 1090ES is used for ADS-B and TIS-B communication and XM satellite radio for FIS-B communication with a distributed equipment network on the ground. This provides increased capacity, accelerated equipage, and reduced deployment cost compared with known systems.

A single link on 1090ES provides a number of advantages. Antennas and transceivers for UAT link processing and redundant 1090ES transmitters for ADS-R availability is not required at the ground station. In addition, ADS-R of UAT on 1090ES results in equivalent congestion to all aircraft on 1090ES. Further, 1090ES equipage based on Mode S transponders reduces ATCRBS interference. By using a single link, there is no possibility of amplification and rebroadcast of invalid signals, i.e., no spoofing. Also, aircraft receive reports from other aircraft regardless of ground system coverage or failure. UAT aircraft retain Mode C transponders for operation with SSR and TCAS.

Figure 1A:
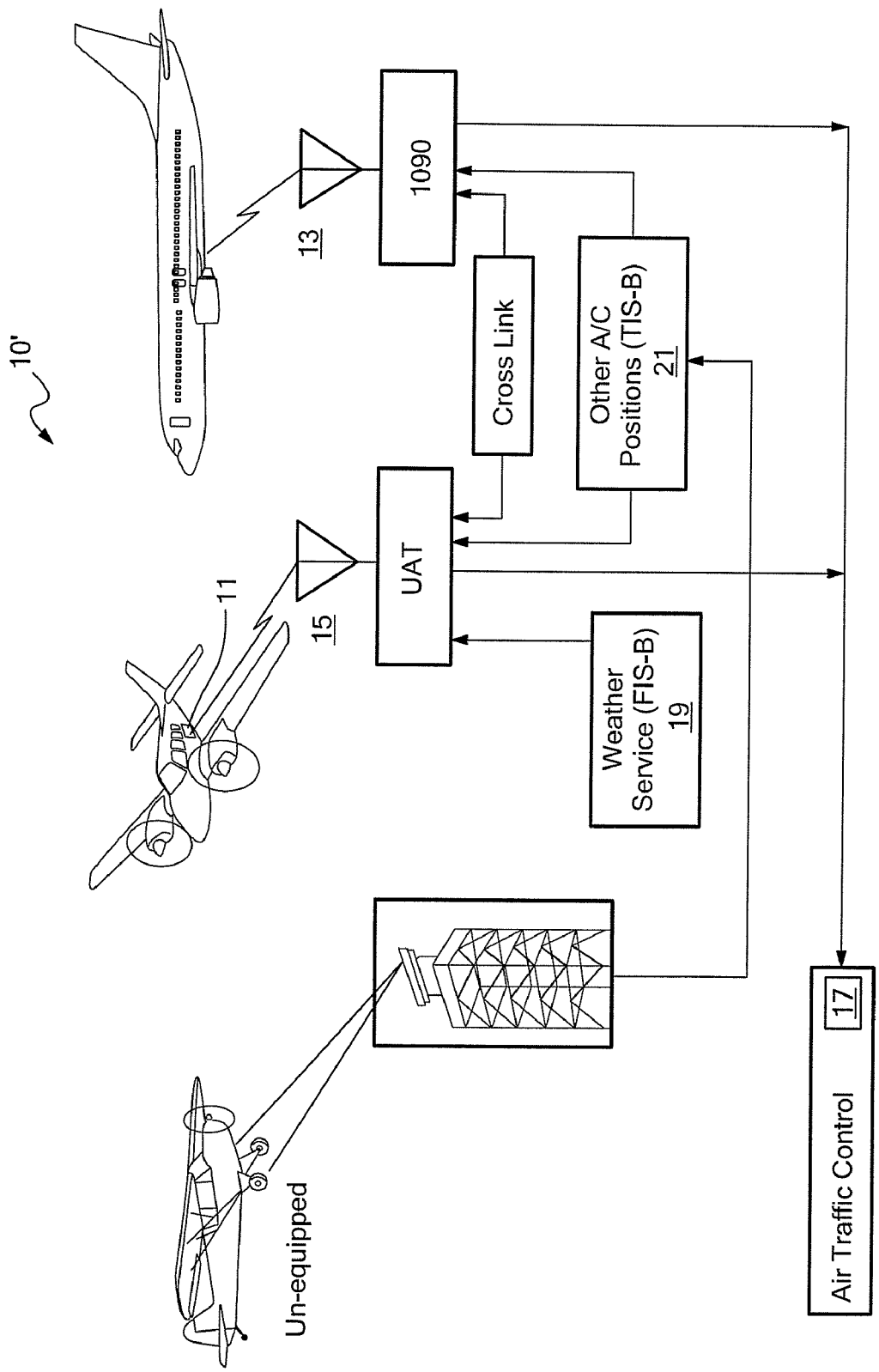
FIG. 1A is a schematic diagram of a multi-link air traffic control system having aircraft address assignment.

FIG. 1A shows a multi-link ADS-B air traffic control system 10' having unique aircraft address assignment module 17 for TIS-B services in accordance with exemplary embodiments of the invention. The system 10' supports aircraft with universal access transceivers (UAT) 11 for communicating with a ground station. Air traffic information is rebroadcast using an ADS-R function via 1090 link. ADS-R interconnects the 1090ES link 13 and the UAT link 15. The FIS-B 19 weather information is also provided via UAT communication. TIS-B 21 provides aircraft traffic information to aircraft. The operation and configuration of dual-link ADS-B systems is well known to one of ordinary skill in the art.

While inventive embodiments of unique aircraft address assignment for TIS-B services is shown and described in conjunction with single and multi-link ADS-B type air traffic control systems, it is understood that exemplary embodiments of inventive unique aircraft address assignment for aircraft traffic services are applicable to air traffic control systems in general in which it is desirable to track aircraft over adjacent regions.

Figure 2:
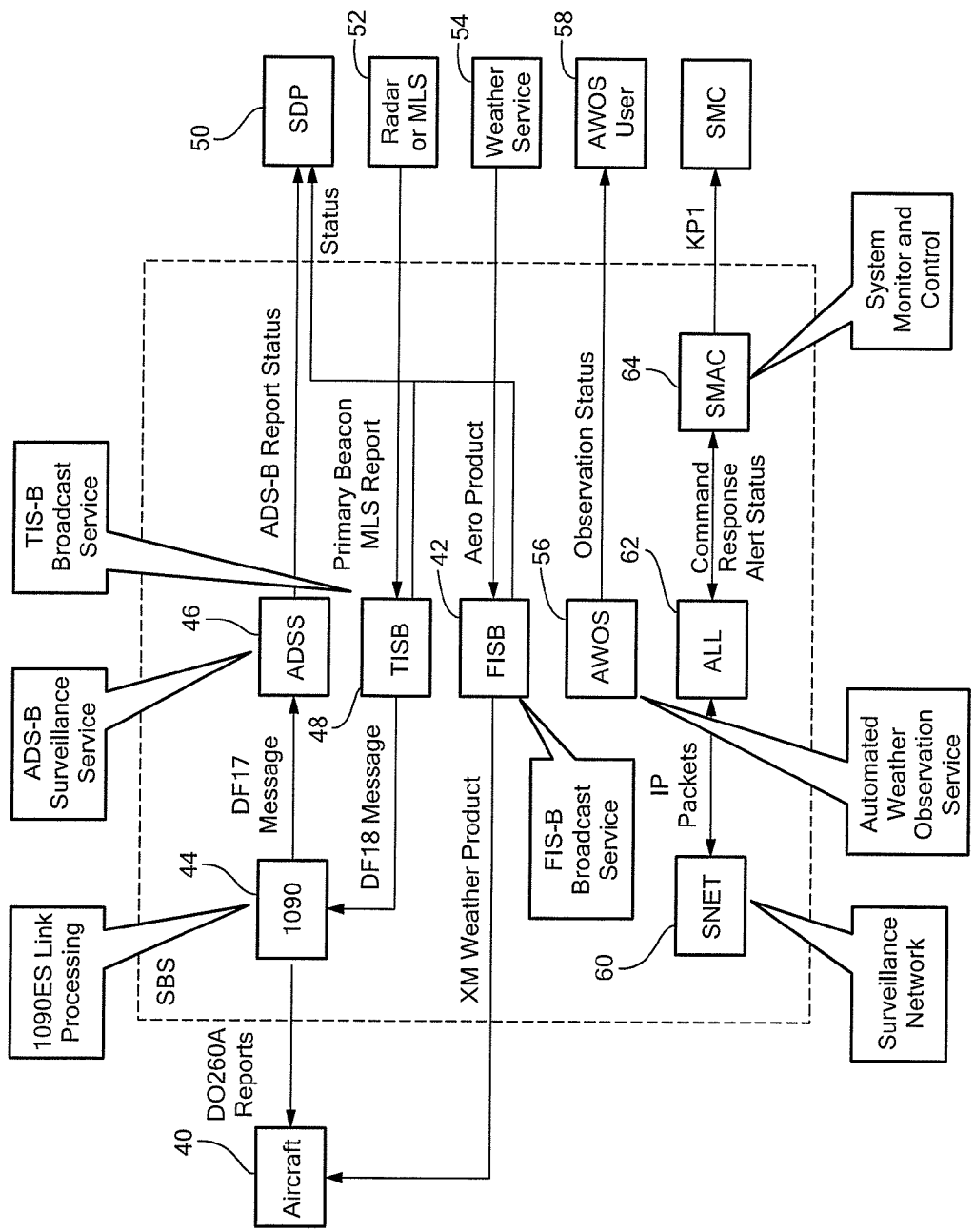
FIG. 2 is a block diagram showing further detail for the air traffic control system of FIG. 1.

FIG. 2 shows further details of the system of FIG. 1, which includes unique aircraft address assignment for TIS-B services 41 in accordance with exemplary embodiments of the invention. The system is partitioned by capability with minimal dependencies allowing independent integration, test, and deployment of ADS-B surveillance, TIS-B and FIS-B services. Link specific processing is separate to minimize the impact of link enhancements.

An aircraft 40 receives XM weather information from an FISB service 42 and communicates via a 1090 MHz link processor 44 with an ADS-B report and status (ADSS) service 46 and a TISB service 48. The ADSS service 46, the TISB service 48, and the FISB service 42 are coupled to the SDP 50. The TISB service 48 receives weather radar information and/or MLS from a service 52. The weather service 54 provides information to the FISB service 42.

A AWOS (automated weather observation service) user 56 receives observation and status information from an AWOS service 58. A surveillance network 60 exchanges packet data with an ALL service 62, which exchanges command, response, alert, and status information with a SMAC (system monitor and control) service 64.

In one aspect of the invention, in general, aircraft that transpond an ADS-B signal have a pre-assigned address that is inserted into the message to uniquely identify the aircraft. Aircraft that are not equipped with ADS-B transponders must still be processed within a system that monitors and reports the locations of all aircraft. However, the TIS-B service does not have any way to determine an equivalent identification directly from the aircraft upon which it is reporting. In order to uniquely identify these aircraft in the same way, a "pseudo" address is assigned. In applications of the TIS-B service where assignment is performed in multiple places to distribute processing load across a number of regions, the system ensures that the pseudo assignment logic assigns and maintains unique addresses across the entire airspace. It does this by assigning addresses from mutually exclusive address pools that are allocated on a regional basis.

Aircraft that originate in a particular region are assigned an address from the range of addresses assigned to that region's address allocation processor. The aircraft then retains that assigned address across contiguous regions covered by the air traffic control system. In an exemplary embodiment that uses distributed tracking, multiple regional TIS-B trackers can cooperate in order to ensure the uniqueness of addresses across the entire National Airspace System (NAS).

Each processor is adapted with a geographic coverage area that includes a buffer region around and within its perimeter. As aircraft enter the buffer region, their corresponding track data, including the assigned address, are shared among the processors to ensure the preservation of the unique address as the aircraft transits the airspace. Each processor checks that a track is about to enter its airspace and discards the data if it is not. In this way, it is not necessary to selectively notify adjacent regions.

Figure 3:
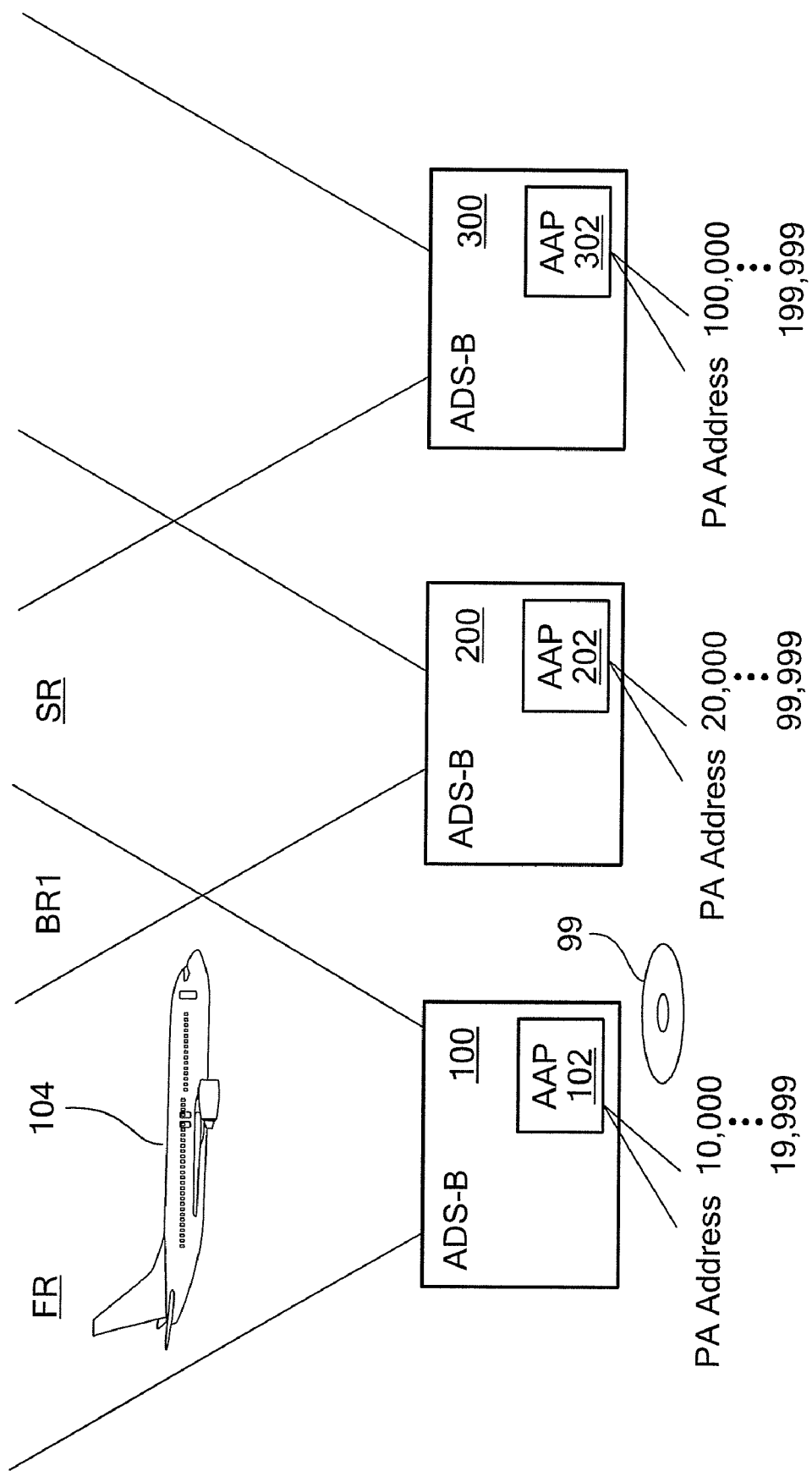
FIG. 3 is a schematic diagram showing aircraft address assignment in accordance with exemplary embodiments of the invention.

FIG. 3 shows an exemplary system in which a first TIS-B system 100 includes an aircraft assignment processor 102 to assign pseudo address for an aircraft 104 that does not have an ADS-B transponder. The aircraft assignment processor 102 includes a range of addresses 106 that are particular to that aircraft assignment processor. If the aircraft 104 originates, e.g., takes off, in a first region FR supported by the first TIS-B system 100, then the aircraft assignment processor 102 for that system assigns the pseudo address to the aircraft 104. Based on the assigned address, the region of origination is known for the aircraft.

As the aircraft 104 enters into a first buffer region BR1 between the first region FR and a second region SR, which is supported by a second TIS-B system 200, the pseudo address and track data for the aircraft are transmitted from the first TIS-B system 100 to all other systems (including, of course, the second TIS-B system 200). The aircraft 104 is not assigned a new address by the second TIS-B system 200, but rather retains the original unique pseudo address assigned by the first TIS-B system 100.

In an exemplary embodiment, track data in the buffer areas are shared among the TIS-B systems 100, 200, 300 so that each system can associate aircraft that are being tracked in its respective coverage area with tracks that are exiting adjacent areas, and therefore already have an address assignment. With this arrangement, a non-ADS-B equipped aircraft can be assigned a unique pseudo address that is maintained across multiple coverage regions. In addition, the region from which the aircraft originated can be easily identified.

One of ordinary skill in the art will readily appreciate that the various functionality described in the exemplary embodiments contained herein can be implemented in a variety of configurations, architectures, and hardware and software partitions. For example, computer readable instructions can be provided a on a disk 99, for example, to enable a machine to perform processing steps.

Figure 4:
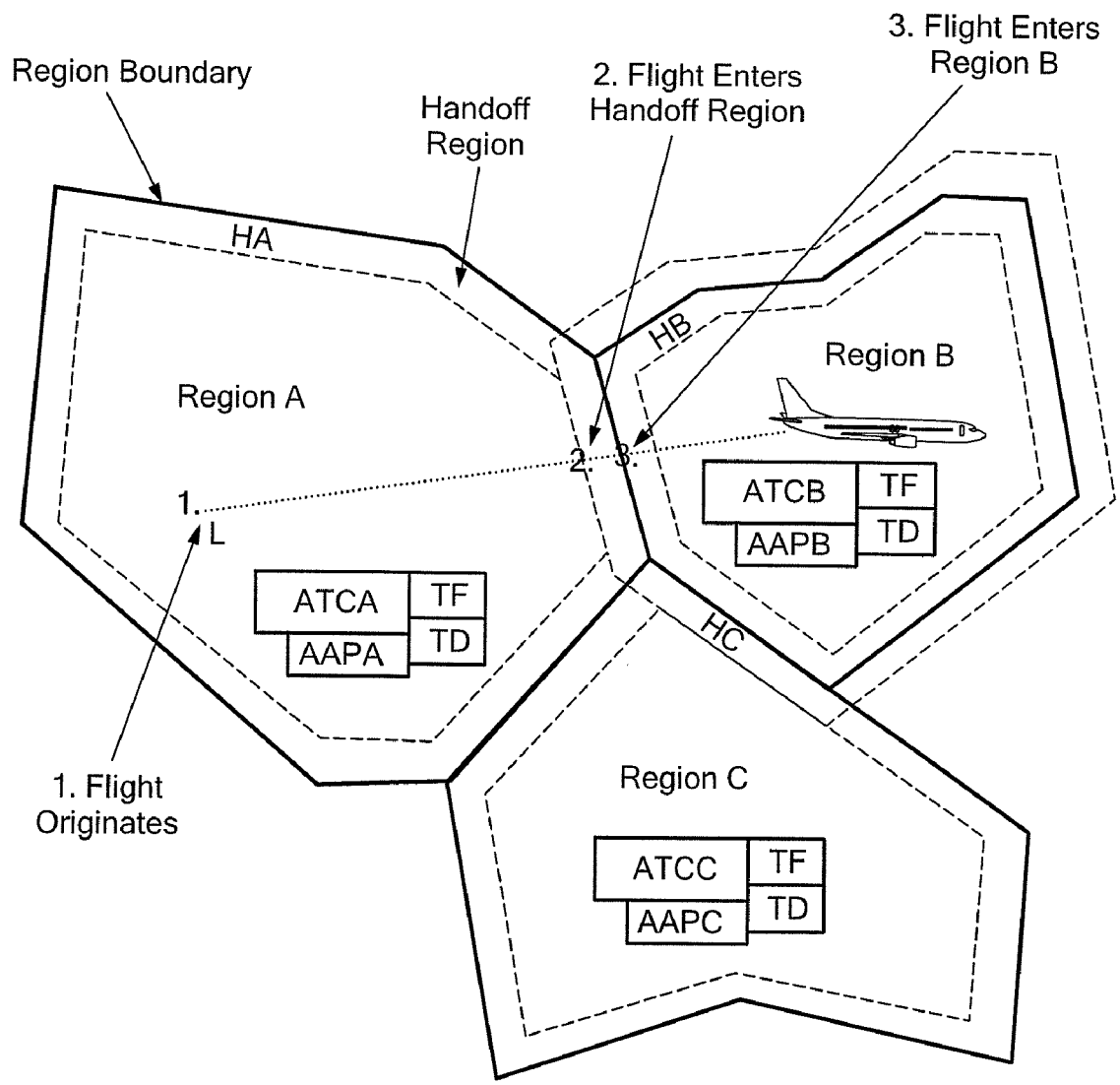
FIG. 4 is a schematic diagram showing further details for aircraft address assignment.

FIG. 4 shows an exemplary configuration of first, second, and third regions A, B, C. The first region A includes a handoff region HA generally defined by a selected distance from the outer perimeter of the region. Similarly, the second region B includes a handoff region HB and the third region C includes a handoff region HC. Each region has a respective TIS-B system TISA, TISB, TISC. Each TIS-B system maintains a track file TF containing track information for each target, e.g., aircraft, within the region. Each system includes an aircraft assignment processor module AAP to assign psuedo addresses from the pool of region addresses to non-ADS-B equipped aircraft, as described above in conjunction with FIG. 3.

It is understood that the size, distance, etc of the handoff region can vary to meet the needs of a particular application. In an exemplary embodiment, the handoff region ranges from about 5 to about 50 miles as measured by the shortest distance for an aircraft to traverse the handoff region. In one embodiment, the handoff region is about 10 miles in distance.

An aircraft takes off from a location L in the first region A. The aircraft assignment processor AAPA of the first TIS-B system TISA for the first region A assigns a unique address for the aircraft from the address pool for the first region and updates the track file TF for the aircraft. As shown, the aircraft travels toward the second region B. The aircraft travels through the first region A, the first handoff area HA, the second handoff region HB, and into the second region B. When the aircraft enters the first handoff region HA the first TIS-B system TISA broadcasts a message containing the track info for the aircraft to the other TIS-B systems in the entire coverage area (e.g., the NAS), including TISB, TISC. The second TIS-B system TISB in the second region B determines that the aircraft will be entering the second region B and begins creating and updating an entry in its track file. When the aircraft is detected by sensors (e.g., radar) within region B, the newly detected track associated with the aircraft is correlated with the track just notified from region A. Consequently, the second aircraft assignment processor AAPB does not generate a new address for the aircraft as the address generated by the first TIS-B system TISA is used.

Figure 5:
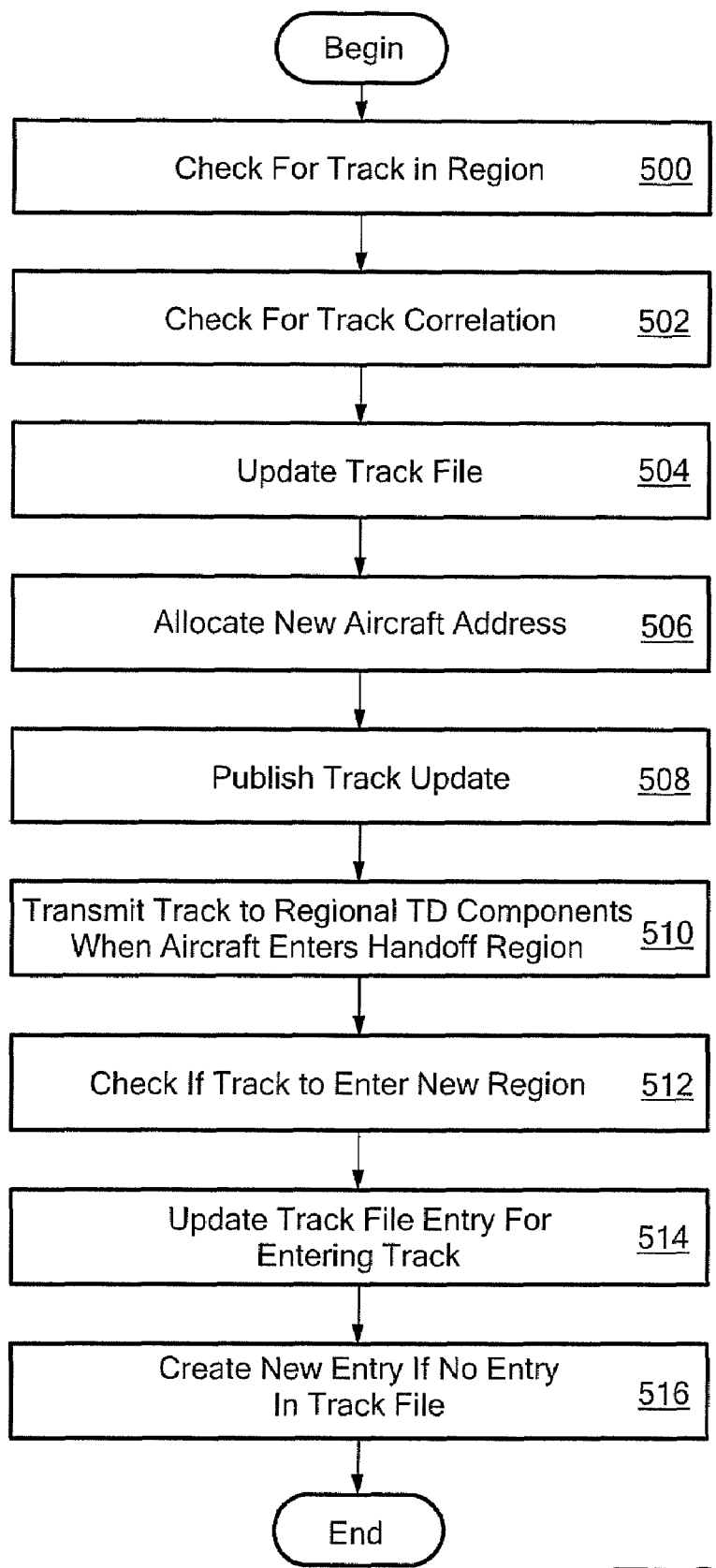
FIG. 5 is a flow diagram showing an exemplary sequence of steps for providing aircraft address assignment in accordance with exemplary embodiments of the invention.

FIG. 5 shows an exemplary sequence of steps for assignment of unique addresses for aircraft. In step 500, upon detection of an aircraft in its sensor (e.g., radar) coverage area, the TIS-B system checks if the track is within the adapted geographic boundary defining its own region. Tracks outside its region can be discarded. The TIS-B system then checks in step 502 if the newly detected track correlates with an entry in its track file, such as by checking the source track ID, position, etc. For existing track file entries, the track file is updated and the existing aircraft address is added to track update messages in step 504. For new entries, in step 506, a new aircraft address is allocated from the region's address pool. For example, when the aircraft in FIG. 4 takes off a new aircraft address for the first region is allocated. In step 508, the track update is published as part of the TIS-B service. Track updates are published as long as the track remains in that region. This also ensures that only one TIS-B regional system will be publishing updates for a specific aircraft, thereby avoiding redundant updates that take up data link bandwidth.

In step 510, when an aircraft approaches a region boundary, such as in FIG. 4 the aircraft heads out of the first region A into the second region B, the track update is transmitted to all TD (TIS distribution) components, such as via a separate multicast address message. The regional TD components subscribe to the handoff multicast group. For each track received on this address, in step 512 each TD checks if the track position lies within the handoff region. The message is ignored if the track is not about to enter a region. For example, when the second TIS-B system TISB in the second region B 'sees' that the aircraft is within 10 miles of the second region boundary, the system checks if the track has the aircraft address in its track file. If so, in step 514, the system updates the entry in the track file with the new track state and notes the source track id (source track id's are associated with a specific sensor). In not, in step 516, the system creates a new entry, including the source track id. Note that a TD track entry may have many source track ids associated with it, dependent on the number of sensors (e.g., radars) covering that aircraft. Creation of a new track file entry can occur as the aircraft first crosses into the handoff region before it is detected within the new region—whether this situation occurs is dependent on radar coverage conditions.

As the track proceeds to enter the second region, Region B in FIG. 4, the TD for the first region TIS-B system TISA ceases publishing the track and the TD for region B will begin publishing the track report. The second region TIS-B system TISB does not assign a new address for the aircraft but rather uses the pseudo address assigned in the first region A.

Exemplary embodiments of the invention are shown having illustrative partitions of hardware and software. Alternative embodiments having different apportionment between hardware and software to meet the needs of a particular application will be readily apparent to one of ordinary skill in the art. In addition, the inventive processing can be implemented in computer programs executed on programmable computers/machines that each includes a processor, a storage medium or other article of manufacture that is readable by the processor (including volatile and non-volatile memory and/or storage elements), at least one input device, and one or more output devices.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:

determining whether a track update for a ADS-B unequipped aircraft correlates with an entry in a track file for first TIS-B system for a first region, the first TIS-B system having a first aircraft assignment processor with a first range of addresses allocated to the first region, wherein the first TIS-B system is adjacent to a second TIS-B system for a second region;

assigning, for a new entry in the track file for the aircraft, a pseudo address for the aircraft from the first range of addresses;

publishing track updates for the aircraft from only a first one of the first and second TIS-B systems, regardless of how many TIS-B systems are actually tracking the aircraft;

transmitting a message to the second TIS-B system for the second region when the aircraft enters a handoff region for the first region without requiring the first TIS-B system to know which region will next provide coverage for the aircraft; and maintaining the pseudo address assigned by the first aircraft assignment processor for the aircraft in the second regions along a route of flight.

2. The method according to claim 1, wherein the handoff region for the first region and a handoff region for the second region are the same region.

3. The method according to claim 1, wherein the first handoff region has a distance ranging from about 5 miles to about 50 miles.

4. The method according to claim 1, wherein the new entry corresponds to the aircraft taking off.

5. A system, comprising:
a first TIS-B system for a first region having a first handoff region, the first TIS-B system having a first aircraft assignment processor to assign pseudo addresses to an aircraft unequipped with an ADS-B transponder;
a second TIS-B system for a second region adjacent to the first region, the second TIS-B system having a second aircraft assignment processor to assign pseudo addresses to an aircraft unequipped with an ADS-B transponder,
wherein the first TIS-B system broadcasts a message containing track information for the aircraft to the second TIS-B system for the second region when an aircraft enters the first handoff region without requiring the first TIS-B system to know which region will next provide coverage for the aircraft, wherein the pseudo address assigned to the aircraft by the first aircraft assignment processor is used by the second TIS-B system for the aircraft.

6. The system according to claim 5, wherein the aircraft assignment processor has an assigned pool of addresses.

7. The system according to claim 5, wherein the first TIS-B system broadcasts the message when the aircraft enters the first handoff region.

8. The system according to claim 7, wherein the second TIS-B system correlates track information for the aircraft in the broadcast message with a target detected by radar.

9. The system according to claim 5, wherein the only a first one of the first and second TIS-B system publishes track updates for the aircraft.

10. An article, comprising:
a computer-readable medium containing stored instructions that enable a machine to perform the steps of:
determining whether a track update for a ADS-B unequipped aircraft correlates with an entry in a track file for first TIS-B system for a first region, the first TIS-B system having a first aircraft assignment processor with a first range of addresses allocated to the first region, wherein the first TIS-B system is adjacent to a second TIS-B system for a second region;
assigning, for a new entry in the track file for the aircraft, a pseudo address for the aircraft from the first range of addresses;
publishing track updates for the aircraft from only a first one of the first and second TIS-B systems, regardless of how many TIS-B systems are actually tracking the aircraft;
transmitting a message to the second TIS-B system for the second region when the aircraft enters a handoff region for the first region without requiring the first TIS-B system to know which region will next provide coverage for the aircraft; and
maintaining the pseudo address assigned by the first aircraft assignment processor for the aircraft in the second regions along a route of flight.

11. The article according to claim 10, further including instructions for the first TIS-B system to broadcast the message when the aircraft enters the first handoff region.

12. The article according to claim 11, further including instructions for enabling the second TIS-B system to correlate track information for the aircraft in the broadcast message with a target detected by radar.

13. The article according to claim 10, wherein the handoff region for the first region and a handoff region for the second region are the same region.

14. The article according to claim 10, wherein the first handoff region has a distance ranging from about 5 miles to about 50 miles.

15. The article according to claim 10, wherein the new entry corresponds to the aircraft taking off.

* * * * *